US009549545B2

(12) United States Patent
Garrett

(10) Patent No.: US 9,549,545 B2
(45) Date of Patent: Jan. 24, 2017

(54) HUNTING STAND AND FIREARM REST THEREFOR

(71) Applicant: Richard Garrett, Laurens, SC (US)

(72) Inventor: Richard Garrett, Laurens, SC (US)

( * ) Notice: Subject to any disclaimer, the term of this patent is extended or adjusted under 35 U.S.C. 154(b) by 0 days.

(21) Appl. No.: 14/749,084

(22) Filed: Jun. 24, 2015

(65) Prior Publication Data

US 2016/0374329 A1 Dec. 29, 2016

(51) Int. Cl.
*A01M 31/02* (2006.01)
*F41A 23/02* (2006.01)

(52) U.S. Cl.
CPC .............. *A01M 31/02* (2013.01); *F41A 23/02* (2013.01)

(58) Field of Classification Search
CPC ......... A01M 31/02; F41A 23/02; F41A 23/00; F41A 23/10
See application file for complete search history.

(56) References Cited

U.S. PATENT DOCUMENTS

| | | | | |
|---|---|---|---|---|
| 5,492,198 A * | 2/1996 | Williams | ................... | A45F 3/26 182/136 |
| 5,628,383 A * | 5/1997 | McIntyre | .............. | A01M 31/02 182/135 |
| 6,243,979 B1 * | 6/2001 | Seats | ................... | A01M 31/025 182/135 |
| 6,811,180 B1 * | 11/2004 | Molliere | ............. | A01M 31/006 182/116 |
| 7,334,837 B1 * | 2/2008 | Long | ..................... | A01M 31/02 297/16.2 |
| 8,556,036 B1 * | 10/2013 | Meredith | .............. | A01M 31/02 182/113 |
| 2002/0088163 A1 * | 7/2002 | Young | .................... | A01M 31/02 42/94 |
| 2003/0042076 A1 * | 3/2003 | Ulrich | ..................... | A63B 27/00 182/136 |
| 2005/0034921 A1 * | 2/2005 | Griffiths | ................ | A01M 31/02 182/20 |
| 2009/0194367 A1 * | 8/2009 | Smith | ..................... | F41A 23/16 182/129 |
| 2012/0227305 A1 * | 9/2012 | Fontenot | ................. | F41A 23/02 42/94 |
| 2013/0014420 A1 * | 1/2013 | Bastian, Jr. | ............. | F41A 23/02 42/94 |
| 2014/0001801 A1 * | 1/2014 | Hutchinson | .............. | A47C 7/62 297/217.1 |

(Continued)

*Primary Examiner* — Katherine Mitchell
*Assistant Examiner* — Marcus Menezes
(74) *Attorney, Agent, or Firm* — Dority & Manning, P.A.

(57) ABSTRACT

Firearm rests for hunting stands are provided. A firearm rest includes a first arm and a second arm. The second arm is spaced apart from the first arm along a lateral direction. The first arm and second arm each include a body extending between a first end and a second end, the body including a fixed portion and a rotational portion that is rotational between an extended position and a retracted position. The firearm rest further includes a cross-beam extending generally along the lateral direction between the first arm and the second arm. The cross-beam is coupled to the first arm at the first end and coupled to the second arm at the first end. The cross-beam has a position along a vertical direction in the extended position that is above a position of the cross-beam along the vertical direction in the retracted position.

20 Claims, 4 Drawing Sheets

(56) References Cited

U.S. PATENT DOCUMENTS

| | | | | |
|---|---|---|---|---|
| 2014/0131137 A1* | 5/2014 | Bassett | ................ | A01M 31/02 182/116 |
| 2014/0311828 A1* | 10/2014 | Bassett | ................ | A01M 31/02 182/124 |
| 2015/0181860 A1* | 7/2015 | Johnson | ................ | A01M 31/02 182/187 |

* cited by examiner

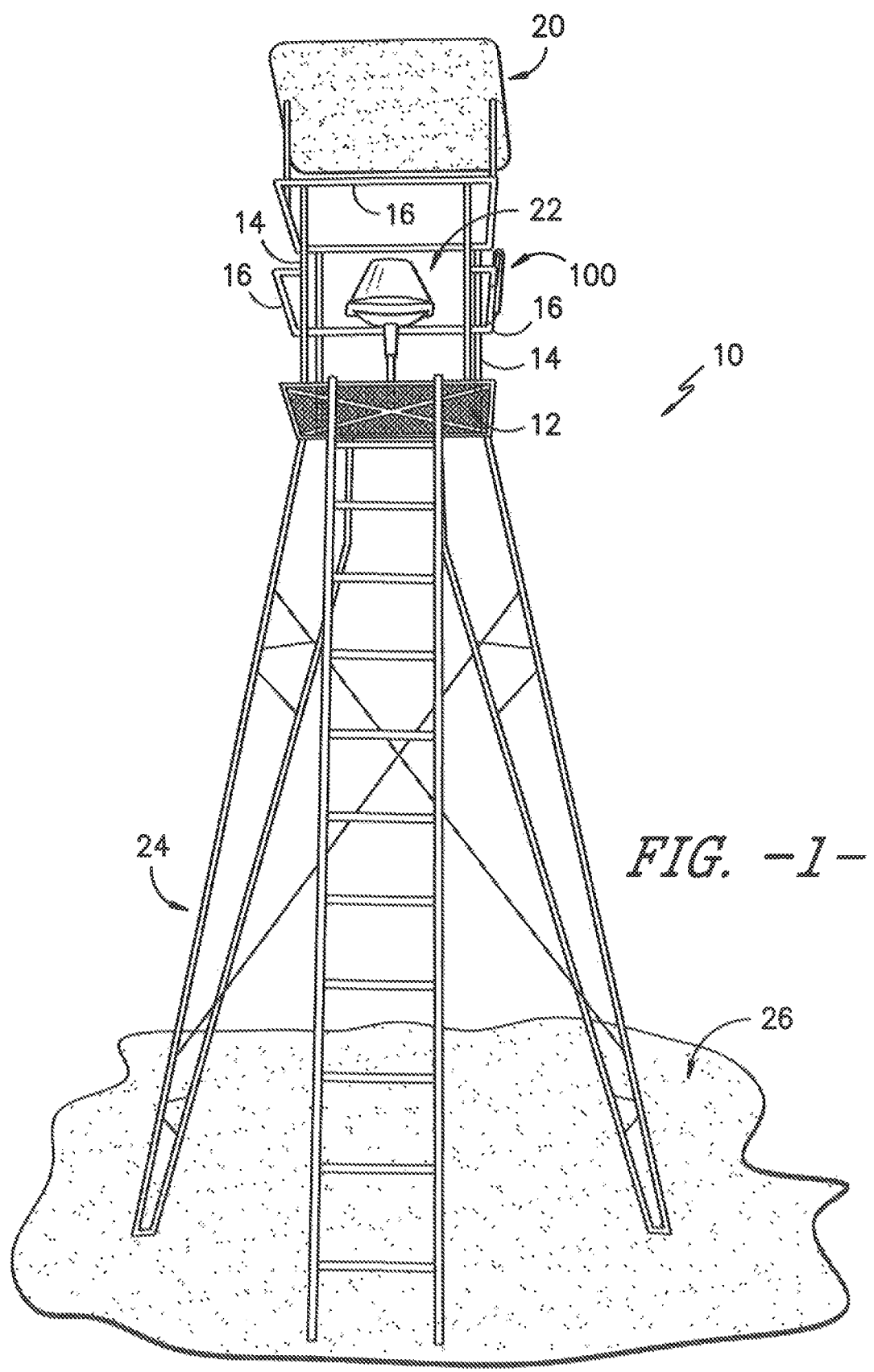
FIG. -1-

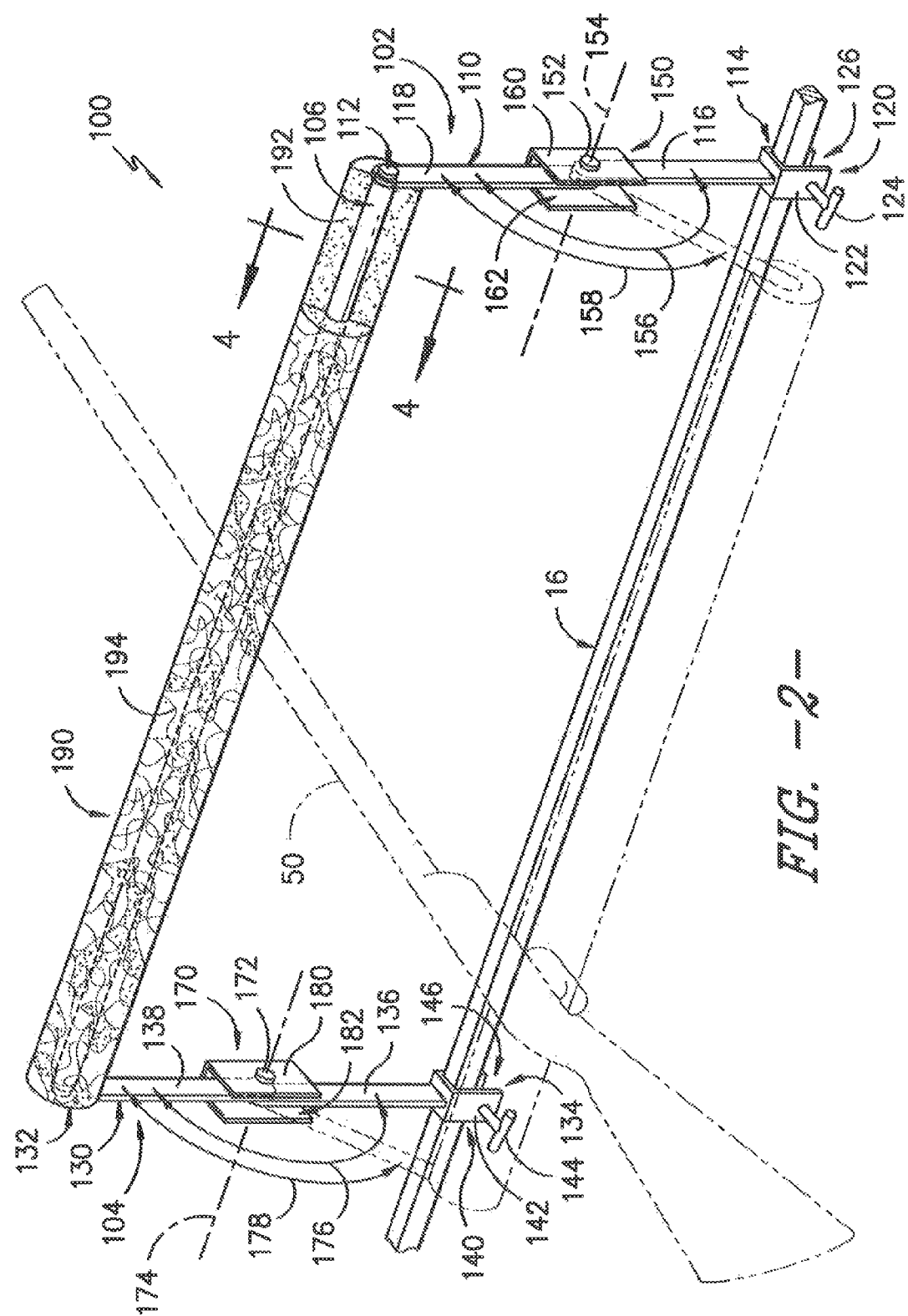
FIG. -2-

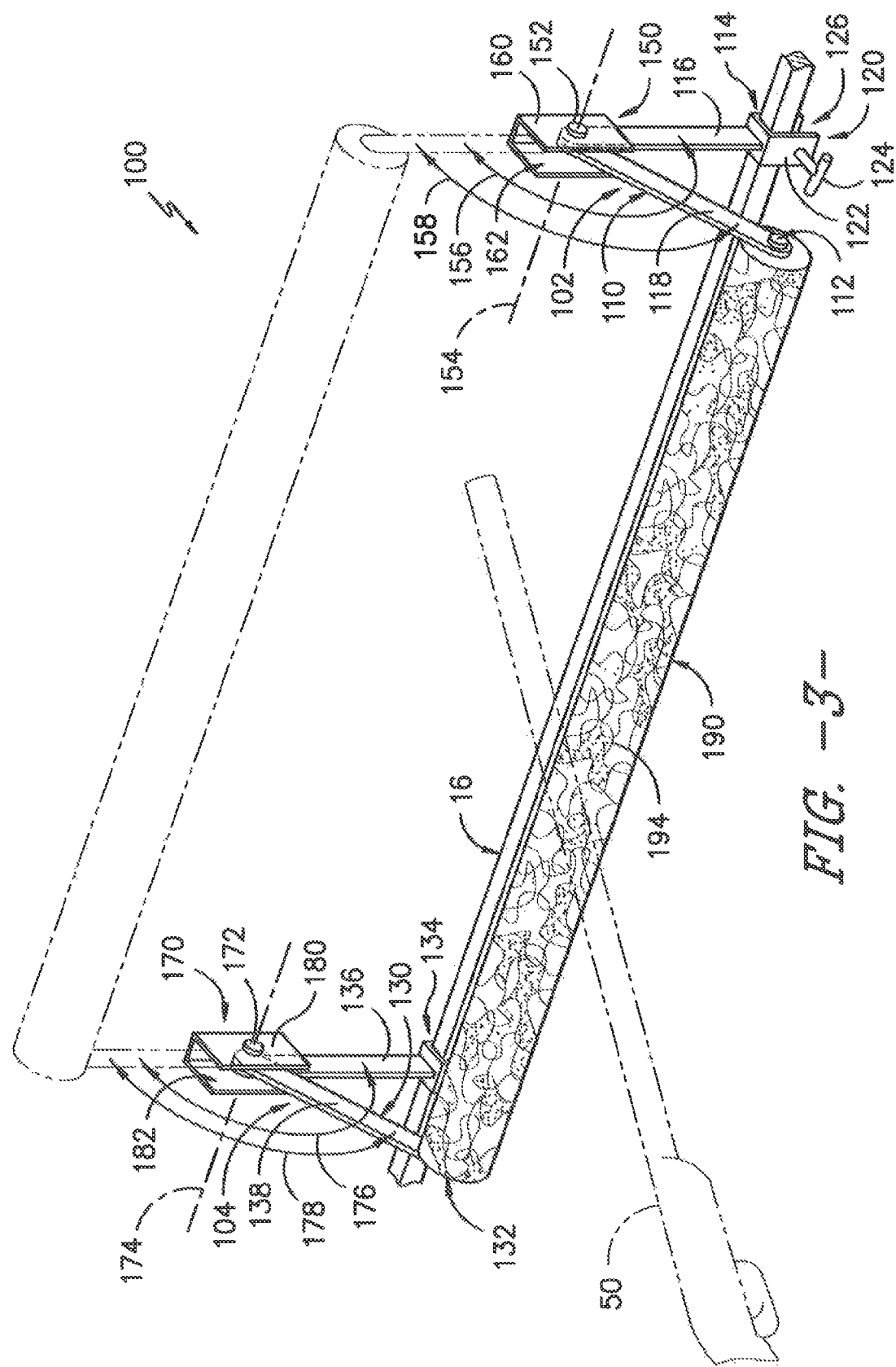
FIG. -3-

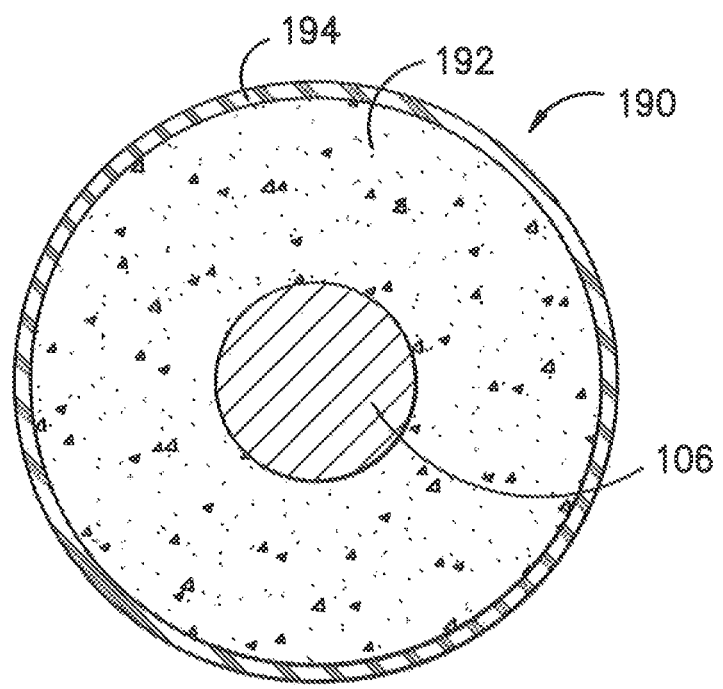
FIG. -4-

HUNTING STAND AND FIREARM REST THEREFOR

FIELD OF THE INVENTION

The present disclosure relates generally to hunting stands and firearm rests for use with hunting stands, and in particular to firearm rests having rotatable features for facilitating varying firearm positions.

BACKGROUND OF THE INVENTION

Hunters, particularly of deer, utilize blinds and elevated hunting stands to cover themselves from sight of the prey and elements of the weather as well as to gain a better vantage from which to fell their game. A typical hunting stand is provided in an elevated position via legs of the hunting stand or via connection of the hunting stand to, for example, a tree. A chair is typically provided in the stand for the hunter to sit in, and rails generally partially surround the hunter.

The rails on a hunting stand are typically provided to protect the hunter from falling from the hunting stand. Additionally, rails can be utilized by the hunter to stabilize a firearm. The hunter can rest the firearm on the rail while aiming and firing a projectile at the subject game animal.

One issue that hunters face when utilizing rails in such a manner, however, is the fixed height and position of the rail. This fixed height and position allows the hunter only a relatively minimal aiming range. If, for example, a subject game animal was to venture too close to the hunting stand or too far away from the hunting stand, the hunter may not be able to pivot his firearm on the fixed rail to a suitable angle to properly aim at the game animal while maintaining the stabilization advantages of the rail.

Accordingly, improved apparatus for stabilizing firearms during hunting in hunting stands would be desired. In particular, apparatus which provide improved, larger aiming ranges for hunters would be advantageous,

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a firearm rest for a hunting stand is provided. The hunting stand includes a rail. The firearm rest includes a first arm and a second arm. The first arm includes a body extending between a first end and a second end, the first arm connectable at the second end to the rail, the body including a fixed portion and a rotational portion that is rotational between an extended position and a retracted position. The second arm is spaced apart from the first arm along a lateral direction. The second arm includes a body extending between a first end and a second end, the second arm connectable at the second end to the rail, the body including a fixed portion and a rotational portion that is rotational between an extended position and a retracted position. The firearm rest further includes a cross-beam extending generally along the lateral direction between the first arm and the second arm. The crossbeam is coupled to the first arm at the first end of the first arm and coupled to the second arm at the first end of the second arm. The cross-beam has a position along a vertical direction in the extended position that is above a position of the cross-beam along the vertical direction in the retracted position.

In accordance with another embodiment of the present disclosure, a hunting stand is provided. The hunting stand includes a base, and a rail positioned above the base along a vertical direction and extending generally along a lateral direction. The hunting stand further includes a firearm rest. The firearm rest includes a first arm and a second arm. The first arm includes a body extending between a first end and a second end, the body including a fixed portion and a rotational portion that is rotational between an extended position and a retracted position. The second arm is spaced apart from the first arm along a lateral direction. The second arm includes a body extending between a first end and a second end, the body including a fixed portion and a rotational portion that is rotational between an extended position and a retracted position. The firearm rest further includes a cross-beam extending generally along the lateral direction between the first arm and the second arm. The cross-beam is coupled to the first arm at the first end of the first arm and coupled to the second arm at the first end of the second arm. The cross-beam has a position along a vertical direction in the extended position that is above a position of the cross-beam along the vertical direction in the retracted position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a front view of a hunting stand in accordance with one embodiment of the present disclosure;

FIG. 2 is a perspective view of a firearm rest removably connected to a rail of a hunting stand and in an extended position in accordance with one embodiment of the present disclosure;

FIG. 3 is a perspective view of a firearm rest removably connected to a rail of a hunting stand and in a retracted position in accordance with one embodiment of the present disclosure; and FIG. 4 is a cross-sectional view of a cross-beam and cushion of a firearm rest in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

FIG. 1 illustrates a hunting stand 10 in accordance with one embodiment of the present disclosure. As illustrated, the hunting stand 10 includes a base 12 on which a hunter can support himself or herself, such as in a standing, kneeling or sitting position. One or more rails may additionally be provided. For example, rails 14 may extend from the base 12 generally upwardly and along a vertical direction V, while rails 16 may be positioned above and spaced from the base 12 along the vertical direction V. One or more rails 16 may extend generally along a lateral direction L. Additionally, one or more rails 16 may extend generally along a transverse direction T. It should be noted that directions V, L and T may be perpendicular to each other, thus defining an orthogonal coordinate system. Further, other suitable rails may be provided in hunting stand 10. The rails 14, 16 may generally provide stability and support to the hunting stand 10, and may further generally enclose a hunter that is in the hunting stand 10 and thus protect the hunter from, for example, falling from the hunting stand 10.

Hunting stand 10 may further include a roof 20, which may be connected to and supported by various rails such as rails 14. Additionally, hunting stand 10 may include a chair 22, which may be positioned on the base 12 for the hunter to sit in when in the hunting stand 10.

Further, in some embodiments, hunting stand 10 may include a plurality of support legs 24. Each support leg 24 may be positioned below base 12 along the vertical direction V, and may extend from the base 12, such as generally towards the ground 26. For example, as shown, support legs 24 may extend between the ground 26 and the base 12 to support the base 12 and the remainder of the hunting stand 10 in an elevated position for optimal hunting views. Alternatively, hunting stand 10 may include connection apparatus for connecting to a tree, and may thus not require support legs.

It should be understood that the present disclosure is not limited to the above described and illustrated hunting stands 10. Rather, any suitable hunting stands, whether free-standing using support legs, connected to trees, or otherwise supported, are within the scope and spirit of the present disclosure.

Referring now to FIGS. 1 through 4, embodiments of a firearm rest 100 for a hunting stand 10 are illustrated. As discussed herein, firearm rests 100 in accordance with the present disclosure are advantageously connectable to rails 16 of the hunting stand 10, and advantageously include components which rotate between extending and retracted positions. Such adjustment between these positions allows a hunter resting his firearm 50 on the firearm rest 100 to adjust the height and position of the firearm 50, thus advantageously increasing the aiming range that the hunter has when resting the firearm 50 on the firearm rest 100. For example, in the extended position, the hunter may be able to angle the firearm 50 at relatively distant targets, such as game animals like deer, while in the retracted position, the hunter may be able to angle the firearm 50 at relatively closer targets. Additionally, in exemplary embodiments, the firearm rest 100 is removable connectable to a rail 16 of a hunting stand 10, so the hunter can transport the firearm rest 100 separately from the hunting stand 10 and between various hunting stands 10 as desired.

As illustrated, firearm rest 100 may include a first arm 102 and a second arm 104. Further, firearm rest 100 may include a cross-beam 106 that extends between, such as generally along lateral direction L, and is coupled to the first arm 102 and the second arm 104. Further, the cross-beam 106 is advantageously movable between an extended position, as illustrated in FIG. 2, and a retracted position, as illustrated in FIG. 3. As illustrated, the cross-beam 106 advantageously has a position along vertical direction V in the extended position that is above a position of the cross-beam 106 along the vertical direction V in the retracted position.

In exemplary embodiments, the first arm 102, second arm 104 and cross-beam 106 are formed from suitable metals, such as steel or aluminum. Alternatively, however, the first arm 102, second arm 104 and cross-beam 106 may be formed from other suitable materials such as suitable hard plastics, etc.

First arm 102 may include a body 110 that extends between a first end 112 and a second end 114. As shown, first arm 102 may be connectable at the second end 114 to a rail 16. For example, in some embodiments, second end 114 may be fixedly connected to a rail 16, such as through welding, brazing, a suitable adhesive, or another suitable joining technique. In other embodiments, second end 114 may be removably connectable to a rail 16. For example, as illustrated, second end 114 may include a first connection assembly 120. The first connection assembly 120 may include a bracket 122 and a mechanical fastener 124, such as a screw, nail, nut/bolt combination, rivet, etc. The bracket 122 may define channel 126 therethrough. In exemplary embodiments as illustrated, bracket 122 may be generally U-shaped, although in alternative embodiments bracket 122 may have another suitable shape. The channel 126 may, for example, have a shape (defined by the bracket 122) that generally corresponds to the cross-sectional shape of the rail 16 to which the firearm rest 100 is being connected. The mechanical fastener 124 may be extendable through the bracket 122, such as through opposing arms of the bracket 122. To connect the arm 102 to rail 16, bracket 122 may be positioned such that a portion of the rail 16 is positioned within channel 126. Mechanical fasteners 124 may then be extended through the bracket 122, such that the portion of the rail 16 within channel 126 is between the bracket 122 and the mechanical fastener 124. This may connect, such as removably connect, the first connection assembly 120, and thus the first arm 102, to the rail 16.

Second arm 104 may be spaced apart from first arm 102, such as along lateral direction L. Similar to first arm 102, second arm 104 may include a body 130 that extends between a first end 132 and a second end 134. As shown, second arm 104 may be connectable at the second end 134 to a rail 16. For example, in some embodiments, second end 134 may be fixedly connected to a rail 16, such as through welding, brazing, a suitable adhesive, or another suitable joining technique. In other embodiments, second end 134 may be removably connectable to a rail 16. For example, as illustrated, second end 134 may include a second connection assembly 140. The second connection assembly 140 may include a bracket 142 and a mechanical fastener 144, such as a screw, nail, nut/bolt combination, rivet, etc. The bracket 142 may define a channel 146 therethrough. In exemplary embodiments as illustrated, bracket 142 may be generally U-shaped, although in alternative embodiments bracket 142 may have another suitable shape, which in exemplary embodiments defines an internal channel. The channel 146 may, for example, have a shape (defined by the bracket 42) that generally corresponds to the cross-sectional shape of the rail 16 to which the firearm rest 100 is being connected. The mechanical fastener 144 may be extendable through the bracket 142, such as through opposing arms of the bracket

142. To connect the arm 104 to rail 16, bracket 142 may be positioned such that a portion of the rail 16 is positioned within channel 146. Mechanical fasteners 144 may then be extended through the bracket 142, such that the portion of the rail 16 within channel 146 is between the bracket 142 and the mechanical fastener 144. This may connect, such as removably connect, the second connection assembly 140, and thus the second arm 104, to the rail 16.

As further illustrated, first arm 102 may include a fixed portion 116 and a rotational portion 118. Fixed portion 116 may include second end 114, while rotational portion 118 may include first end 112. Rotational portion 118 may be rotatable, such as relative to fixed portion 116, between an extended position (as illustrated in FIG. 2) and a retracted position (as illustrated in FIG. 3).

Rotational portion 118 may be rotationally connected to fixed portion 116, such as at ends spaced respectively from the first end 112 and second end 114. For example, first arm 102 may include a first pivot assembly 150. The first pivot assembly 150 may include a mechanical fastener 152 that extends through the fixed portion 116 and the rotational portion 118 (such as at the ends spaced respectively from the first end 112 and second end 114 thereof) to rotationally couple the fixed portion 116 and rotational portion 118 together. Mechanical fastener 152 may define a pivot point 154 for rotation of the rotational portion 118 about the fixed portion 116. Rotational portion 118 may thus be rotatable about the pivot point 154 and relative to the fixed portion 116 between extended and retracted positions.

An angle of rotation 156 of the rotational portion 118 relative to the fixed portion 116 may be defined, as illustrated. In exemplary embodiments, the angle of rotation 156 in the extended position may be approximately 190 degrees or less, such as in some embodiments between approximately 175 and approximately 185 degrees, such as in some embodiments approximately 180 degrees. Further, in exemplary embodiments, rotation of the rotational portion 118 beyond an angle of rotation of approximately 190 degrees, such as approximately 185 degrees, such as approximately 180 degrees, may be prevented. For example, first pivot assembly 150 may further include a bracket 160. The bracket 160 may define a channel 162 therethrough. In exemplary embodiments as illustrated, bracket 160 may be generally U-shaped, although in alternative embodiments bracket 160 may have another suitable shape, which in exemplary embodiments defines an internal channel. Mechanical fastener 152 may additionally extend through bracket 160, such as through opposing arms of the bracket 160. Portions of the fixed portion 116 and rotational portion 118, such as including the ends spaced respectively from the first end 112 and second end 114 may be disposed within the channel 162 such that channel 162 houses these portions. The bracket 160 may be configured to prevent rotation of the rotational portion 118 past an angle 156 of approximately 190 degrees, such as approximately 185 degrees, such as approximately 180 degrees. For example, rotational portion 118 may in the extended position contact an inner surface of the bracket 160, which may additionally contact the fixed portion 116. Such contact of the fixed and rotational portions 116, 118 may prevent rotation past angle 156 of approximately 190 degrees, such as approximately 185 degrees, such as approximately 180 degrees.

Similarly, and as further illustrated, second arm 104 may include a fixed portion 136 and a rotational portion 138. Fixed portion 136 may include second end 134, while rotational portion 138 may include first end 132. Rotational portion 138 may be rotatable, such as relative to fixed portion 136, between an extended position (as illustrated in FIG. 2) and a retracted position (as illustrated in FIG. 3).

Rotational portion 138 may be rotationally connected to fixed portion 136, such as at ends spaced respectively from the first end 132 and second end 134. For example, second arm 104 may include a second pivot assembly 170. The second pivot assembly 170 may include a mechanical fastener 172 that extends through the fixed portion 136 and the rotational portion 138 (such as at the ends spaced respectively from the first end 132 and second end 134 thereof) to rotationally couple the fixed portion 136 and rotational portion 138 together. Mechanical fastener 172 may define a pivot point 174 for rotation of the rotational portion 138 about the fixed portion 136. Rotational portion 138 may thus be rotatable about the pivot point 174 and relative to the fixed portion 136 between extended and retracted positions.

An angle of rotation 176 of the rotational portion 138 relative to the fixed portion 136 may be defined, as illustrated. In exemplary embodiments, the angle of rotation 176 in the extended position may be approximately 190 degrees or less, such as in some embodiments between approximately 175 and approximately 185 degrees, such as in some embodiments approximately 180 degrees. Further, in exemplary embodiments, rotation of the rotational portion 138 beyond an angle of rotation of approximately 190 degrees, such as approximately 185 degrees, such as approximately 180 degrees, may be prevented. For example, second pivot assembly 170 may further include a bracket 180. The bracket 180 may define a channel 182 therethrough. In exemplary embodiments as illustrated, bracket 180 may be generally U-shaped, although in alternative embodiments bracket 180 may have another suitable shape, which in exemplary embodiments defines an internal channel. Mechanical fastener 172 may additionally extend through bracket 180, such as through opposing arms of the bracket 180. Portions of the fixed portion 136 and rotational portion 138, such as including the ends spaced respectively from the first end 132 and second end 134 may be disposed within the channel 182 such that channel 182 houses these portions. The bracket 180 may be configured to prevent rotation of the rotational portion 138 past an angle 176 of approximately 190 degrees, such as approximately 185 degrees, such as approximately 180 degrees. For example, rotational portion 138 may in the extended position contact an inner surface of the bracket 180, which may additionally contact the fixed portion 136. Such contact of the fixed and rotational portions 136, 138 may prevent rotation past angle 176 of approximately 190 degrees, such as approximately 185 degrees, such as approximately 180 degrees.

Additionally, as illustrated in FIG. 3, a maximum angle of rotation 158 of the rotational portion 118 of the first arm 102 between the extended position and the retracted position may be defined. In exemplary embodiments, the maximum angle of rotation 158 is greater than approximately 90 degrees, such as greater than approximately 105 degrees, such as greater than approximately 120 degrees. Similarly, a maximum angle of rotation 178 of the rotational portion 138 of the second arm 104 between the extended position and the retracted position may be defined. In exemplary embodiments, the maximum angle of rotation 178 is greater than approximately 90 degrees, such as greater than approximately 105 degrees, such as greater than approximately 120 degrees.

As discussed and as illustrated, cross-beam 106 may extend between first arm 102 and second arm 104, such as generally along lateral direction 1. Cross-beam 106 may further be coupled to the first arm 102 and the second arm 104. For example, cross-beam 106 may be coupled to the first arm 102 at the first end 112 thereof, and may be coupled to the second arm 104 at the first end 132 thereof. Accordingly, cross-beam 106 may be coupled to the rotational portions 118, 138 of the first and second arms 102, 104, and may thus be movable with the rotational portions 118, 138 as they rotate about the respective fixed portions 116, 136. As illustrated in FIGS. 2 and 3, cross-beam 106 may thus have position along vertical direction V in the extended position that is above a position of the cross-beam 106 along vertical direction V in the retracted position. A hunter can advantageously adjust the cross-beam to the extended position and retracted position as desired to support the hunter's firearm 50 in a suitable position and at a suitable angle for aiming, such as at a target game animal.

In some embodiments, a hunter may rest his or her firearm 50 directly on the cross-beam 106. In other embodiments, a cushion 90 may be included in Firearm rest 100. The cushion 90 may generally surround at least a portion of the cross-beam 106, and the hunter may rest his or her firearm 50 on the cushion 90. Referring now to FIGS, 2 through 4, cushion 90 may include a layer 92 formed from a foam or other suitable pliable material. This layer 92 may generally surround at least a portion of the cross-beam 106. In some embodiments, cushion 90 may further include a skin 94 which generally surrounds at least a portion of the layer 92. The skin 94 may be formed from a suitable fabric, such as a woven cloth. In exemplary embodiments, skin 94 may include a suitable pattern printed thereon, such as a suitable camouflage pattern. Use of such a pattern may allow the cross-beam 106 and firearm rest 100 generally to blend into the surrounding environment during use, thus preventing target game animals from noticing the firearm rest 100 and escaping.

Accordingly, firearm rests 100 and hunting stands 10 in accordance with the present disclosure advantageously facilitate improved hunting from hunting stands 10. Movement of the firearm rest 100 between the extended position and retracted position, for example, advantageously provides improved and increased aiming range for the hunter in the hunting stand 10, thus providing improved ability to, for example, fell target game animals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A firearm rest for a hunting stand, the hunting stand comprising a rail, the firearm rest comprising:
    a first arm comprising a first body extending between a first end and a second end, the first arm connectable at the second end to the rail, the first body comprising a fixed portion and a rotational portion that is rotational between an extended position and a retracted position, wherein the first arm further comprises a first pivot assembly, the first pivot assembly comprising a mechanical fastener extending through the fixed portion and the rotational portion of the first arm and defining a pivot point for the rotational portion of the first arm, wherein the first pivot assembly further comprises a first bracket defining a first channel, the first channel housing portions of the fixed portion and the rotational portion of the first arm, the first bracket configured to prevent rotation of the rotational portion of the first arm past approximately 190 degrees relative to the fixed portion of the first arm;
    a second arm spaced apart from the first arm along a lateral direction, the second arm comprising a second body extending between a first end and a second end, the second arm connectable at the second end to the rail, the second body comprising a fixed portion and a rotational portion that is rotational between an extended position and a retracted position, wherein the second arm further comprises a second pivot assembly, the second pivot assembly comprising a mechanical fastener extending through the fixed portion and the rotational portion of the second arm and defining a pivot point for the rotational portion of the second arm, wherein the second pivot assembly further comprises a second bracket defining a second channel, the second channel housing portions of the fixed portion and the rotational portion of the second arm, the second bracket configured to prevent rotation of the rotational portion of the second arm past approximately 190 degrees relative to the fixed portion of the second arm; and
    a cross-beam extending generally along the lateral direction between the first arm and the second arm, the cross-beam coupled to the first arm at the first end of the first arm and coupled to the second arm at the first end of the second arm,
    wherein the cross-beam has a position along a vertical direction in the extended position of the first and second arms that is above a position of the cross-beam along the vertical direction in the retracted position of the first and second arms.

2. The firearm rest of claim 1, further comprising a cushion generally surrounding at least a portion of the cross-beam.

3. The firearm rest of claim 2, wherein the cushion comprises a foam layer.

4. The firearm rest of claim 3, wherein the cushion further comprises a skin generally surrounding at least a portion of the foam layer.

5. The firearm rest of claim 1, wherein the bracket of the first pivot assembly and the bracket of the second pivot assembly are each generally U-shaped.

6. The firearm rest of claim 1, wherein the second end of the first arm comprises a first connection assembly, the first connection assembly comprising a bracket and a mechanical fastener extendable through the bracket of the first connection assembly, and wherein the second end of the second arm comprises a second connection assembly, the second connection assembly comprising a bracket and a mechanical fastener extendable through the bracket of the second connection assembly.

7. The firearm rest of claim 6, wherein the bracket of the first connection assembly and the bracket of the second connection assembly are each generally U-shaped.

8. The firearm rest of claim 1, wherein the first arm, second arm and cross-beam are each formed from a metal.

9. The firearm rest of claim 1, wherein maximum angles of rotation of the rotational portion of the first arm and the rotational portion of the second arm from the extended position to the retracted position are greater than 90 degrees.

10. A hunting stand, comprising:
a base;
a rail positioned above the base along a vertical direction and extending generally along a lateral direction; and
a firearm rest, the firearm rest comprising:
  a first arm comprising a first body extending between a first end and a second end, the body comprising a fixed portion and a rotational portion that is rotational between an extended position and a retracted position, wherein the first arm further comprises a first pivot assembly, the first pivot assembly comprising a mechanical fastener extending through the fixed portion and the rotational portion of the first arm and defining a pivot point for the rotational portion of the first arm, wherein the first pivot assembly further comprises a first bracket defining a first channel, the first channel housing portions of the fixed portion and the rotational portion of the first arm, the first bracket configured to prevent rotation of the rotational portion of the first arm past approximately 190 degrees relative to the fixed portion of the first arm;
  a second arm spaced apart from the first arm along a lateral direction, the second arm comprising a second body extending between a first end and a second end, the second body comprising a fixed portion and a rotational portion that is rotational between an extended position and a retracted position, wherein the second arm further comprises a second pivot assembly, the second pivot assembly comprising a mechanical fastener extending through the fixed portion and the rotational portion of the second arm and defining a pivot point for the rotational portion of the second arm, wherein the second pivot assembly further comprises a second bracket defining a second channel, the second channel housing portions of the fixed portion and the rotational portion of the second arm, the second bracket configured to prevent rotation of the rotational portion of the second arm past approximately 190 degrees relative to the fixed portion of the second arm; and
  a cross-beam extending generally along the lateral direction between the first arm and the second arm, the cross-beam coupled to the first arm at the first end of the first arm and coupled to the second arm at the first end of the second arm,
  wherein the cross-beam has a position along a vertical direction in the extended position of the first and second arms that is above a position of the cross-beam along the vertical direction in the retracted position of the first and second arms.

11. The hunting stand of claim 10, wherein the first arm is removably connectable at the second end of the first arm to the rail and wherein the second arm is removably connectable at the second end of the second arm to the rail.

12. The hunting stand of claim 10, further comprising a chair positioned on the base.

13. The hunting stand of claim 10, further comprising a plurality of support legs positioned below the base along the vertical direction and extending from the base.

14. The hunting stand of claim 10, wherein the firearm rest further comprises a cushion generally surrounding at least a portion of the cross-beam.

15. The hunting stand of claim 10, wherein the second end of the first arm comprises a first connection assembly, the first connection assembly comprising a bracket and a mechanical fastener extendable through the bracket of the first connection assembly, and wherein the second end of the second arm comprises a second connection assembly, the second connection assembly comprising a bracket and a mechanical fastener extendable through the bracket of the second connection assembly.

16. The hunting stand of claim 10, wherein maximum angles of rotation of the rotational portion of the first arm and the rotational portion of the second arm from the extended position to the retracted position are greater than 90 degrees.

17. A firearm rest for a hunting stand, the hunting stand comprising a rail, the firearm rest comprising;
  a first arm comprising a first body extending between a first end and a second end, the first arm connectable at the second end to the rail, the first body comprising a fixed portion and a rotational portion that is rotational between an extended position and a retracted position;
  a second arm spaced apart from the first arm along a lateral direction, the second arm comprising a second body extending between a first end and a second end, the second arm connectable at the second end to the rail, the second body comprising a fixed portion and a rotational portion that is rotational between an extended position and a retracted position; and
  a cross-beam extending generally along the lateral direction between the first arm and the second arm, the cross-beam coupled to the first arm at the first end of the first arm and coupled to the second arm at the first end of the second arm,
  wherein the cross-beam has a position along a vertical direction in the extended position of the first and second arms that is above a position of the cross-beam along the vertical direction in the retracted position of the first and second arms, and
  wherein at least one of the first arm or the second arm further comprises a pivot assembly, the pivot assembly comprising a mechanical fastener extending through the fixed portion and the rotational portion of the at least one of the first arm or the second arm and defining a pivot point for the rotational portion of the at least one of the first arm or the second arm, wherein the pivot assembly further comprises a bracket defining a channel, the channel housing portions of the fixed portion and the rotational portion of the at least one of the first arm or the second arm, the bracket configured to prevent rotation of the rotational portion of the at least one of the first arm or the second arm past approximately 190 degrees relative to the fixed portion of the at least one of the first arm or the second arm.

18. The firearm rest of claim 17, further comprising a cushion generally surrounding at least a portion of the cross-beam.

19. The firearm rest of claim 17, wherein the second end of the first arm comprises a first connection assembly, the first connection assembly comprising a bracket and a mechanical fastener extendable through the bracket of the first connection assembly, and wherein the second end of the second arm comprises a second connection assembly, the second connection assembly comprising a bracket and a mechanical fastener extendable through the bracket of the second connection assembly.

20. The firearm rest of claim 17, wherein maximum angles of rotation of the rotational portion of the first arm and the rotational portion of the second arm from the extended position to the retracted position are greater than 90 degrees.

* * * * *